(12) United States Patent
Kim

(10) Patent No.: US 8,988,189 B2
(45) Date of Patent: Mar. 24, 2015

(54) METHOD FOR CONTROLLING SMART KEY SYSTEM FOR DOOR LOCK

(75) Inventor: Hyunki Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/241,910

(22) Filed: Sep. 23, 2011

(65) Prior Publication Data

US 2012/0280791 A1 Nov. 8, 2012

(30) Foreign Application Priority Data

May 3, 2011 (KR) .................. 10-2011-0042112

(51) Int. Cl.
*G08B 29/00* (2006.01)
*E05B 77/14* (2014.01)
*B60R 25/24* (2013.01)
*G07C 9/00* (2006.01)

(52) U.S. Cl.
CPC ............. *E05B 77/14* (2013.01); *B60R 25/24* (2013.01); *G07C 9/00309* (2013.01); *G07C 2209/63* (2013.01)
USPC ........................................................ 340/5.72

(58) Field of Classification Search
CPC ...... E05B 77/14; B60R 25/24; G07C 9/00309
USPC ............ 340/5.72, 426.11, 426.26, 5.71, 5.73, 340/5.2, 5.6, 5.61, 5.62, 10.1, 10.6; 341/176
See application file for complete search history.

(56) References Cited

U.S. PATENT DOCUMENTS

| 6,400,042 | B1 * | 6/2002 | Winner et al. ............... 307/10.5 |
| 2003/0137195 | A1 * | 7/2003 | Suzuki ......................... 307/10.6 |
| 2009/0096578 | A1 * | 4/2009 | Ogino et al. ................. 340/5.72 |
| 2009/0224879 | A1 * | 9/2009 | Nakazawa et al. ........... 340/5.72 |
| 2010/0231369 | A1 * | 9/2010 | Oya ........................... 340/426.11 |

FOREIGN PATENT DOCUMENTS

| CN | 101135209 A | 3/2008 |
| CN | 101135212 A | 3/2008 |
| CN | 201129085 Y | 10/2008 |
| CN | 201614796 U | 10/2010 |
| CN | 201778566 U | 3/2011 |
| CN | 201778576 U | 3/2011 |
| JP | 2008-266894 A | 11/2008 |

* cited by examiner

*Primary Examiner* — Nabil Syed
(74) *Attorney, Agent, or Firm* — Saliwanchik, Lloyd & Eisenschenk

(57) ABSTRACT

The present disclosure relates to a method for controlling a smart key system for door lock of a vehicle configured with at least two modes, the method including selecting one of a first mode and a second mode, detecting an ON/OFF state of an engine of the vehicle and a key signal of a smart key, activating a door lock function performed outside of the vehicle, if it is confirmed through the key signal that the smart key is present outside of the vehicle, in case the first mode is selected, and deactivating a door lock function performed outside of the vehicle, if it is confirmed through the key signal that the smart key is present inside the vehicle or the engine is running, in case the second mode is selected.

5 Claims, 3 Drawing Sheets

METHOD FOR CONTROLLING SMART KEY SYSTEM FOR DOOR LOCK

CROSS-REFERENCE TO RELATED APPLICATION

This application claims the benefit under 35 U.S.C. §119 of Korean Application No. 10-2011-0042112, filed May 3, 2011, which is hereby incorporated by reference in its entirety.

BACKGROUND OF THE DISCLOSURE

1. Field of the Invention

Exemplary embodiments of the present disclosure may relate to a smart key system, and more particularly to a method for controlling a smart key system for door lock.

2. Background

Devices have been recently propagated for consumer satisfaction and convenience of vehicle power performance. In a non-limiting example, trend is that a smart key to vehicles is being widely generalized. A driver can lock or unlock a vehicle door with a smart key in the driver's pocket, and the functionality and advantages of the smart key is further highlighted in a situation where the driver is carrying a bag or is wearing an umbrella.

Meanwhile, in a case a driver stays away from a vehicle for a short period of time with an engine of the vehicle still running and carrying a smart key, there is generated a warning sound from inside of the vehicle. This is to warn the driver that the smart key is being deviated from the vehicle while the engine is still running, but may provide a passenger inside the vehicle with a bad feeling. Furthermore, a door lock for the vehicle cannot be used from outside of the vehicle under this situation, and a vehicle theft may happen if there is no one inside the vehicle.

Therefore, there is a need for a door lock that can be used in a situation where an engine of a vehicle equipped with a smart key system is still running and that can prevent a vehicle theft.

BRIEF SUMMARY

The present disclosure is disclosed to solve the abovementioned problems and disadvantages and the present disclosure provides a method for controlling a smart key system for door lock configured to enable a driver to lock a vehicle door outside the vehicle with a smart key still being held while an engine of the vehicle is still running, and to prevent a vehicle theft in case.

Technical subjects to be solved by the present disclosure are not restricted to the abovementioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

In one general broad aspect of the present disclosure, there is provided a method for controlling a smart key system for door lock of a vehicle configured with at least two modes, the method comprising: selecting one of a first mode and a second mode; detecting an ON/OFF state of an engine of the vehicle and a key signal of a smart key; and activating a door lock function performed outside of the vehicle, if it is confirmed through the key signal that the smart key is present outside of the vehicle, in case the first mode is selected.

Preferably, the method further comprises deactivating a door lock function performed outside of the vehicle, if it is confirmed through the key signal that the smart key is present inside the vehicle or the engine is running, in case the second mode is selected.

Preferably, the method further comprises: monitoring a state of the vehicle if the door lock function performed outside of the vehicle is activated; and turning off the engine as a result of the monitoring step.

Preferably, the step of monitoring the state of vehicle comprises monitoring one of ON/OFF state of the engine and travel speed of the vehicle.

Preferably, the method comprises recognizing, as a result of monitoring, as the vehicle having been stolen if the vehicle is moving.

Preferably, the method further comprises transmitting a theft warning message to the police or a vehicle owner that the vehicle has been stolen if it is recognized that the vehicle is stolen.

Preferably, the step of activating a door lock function performed outside of the vehicle comprises allowing a user possessing the smart key to perform the door lock function outside of the vehicle.

Preferably, the step of activating a door lock function performed outside of the vehicle further comprises performing a lockup of a steering wheel if the door lock function is performed outside of the vehicle.

The method for controlling a smart key system for door lock of a vehicle according to exemplary embodiments of the present disclosure has an advantageous effect in that a driver possessing a smart key can lock or unlock a door lock device (door lock) of a vehicle equipped with a smart key system under a state the smart key is located outside of the vehicle, thereby providing the driver a convenience, a function that is performed only by a passive key of the smart key, and a function capable of preventing a vehicle theft that may be resulted from the door lock function performed outside of the vehicle, the operations of which can be activated or deactivated by a user selection.

BRIEF DESCRIPTION OF THE DRAWINGS

Accompanying drawings are included to provide a further understanding of arrangements and embodiments of the present disclosure and are incorporated in and constitute a part of this application. Now, non-limiting and non-exhaustive exemplary embodiments of the disclosure are described with reference to the following drawings, in which.

Figure 1:
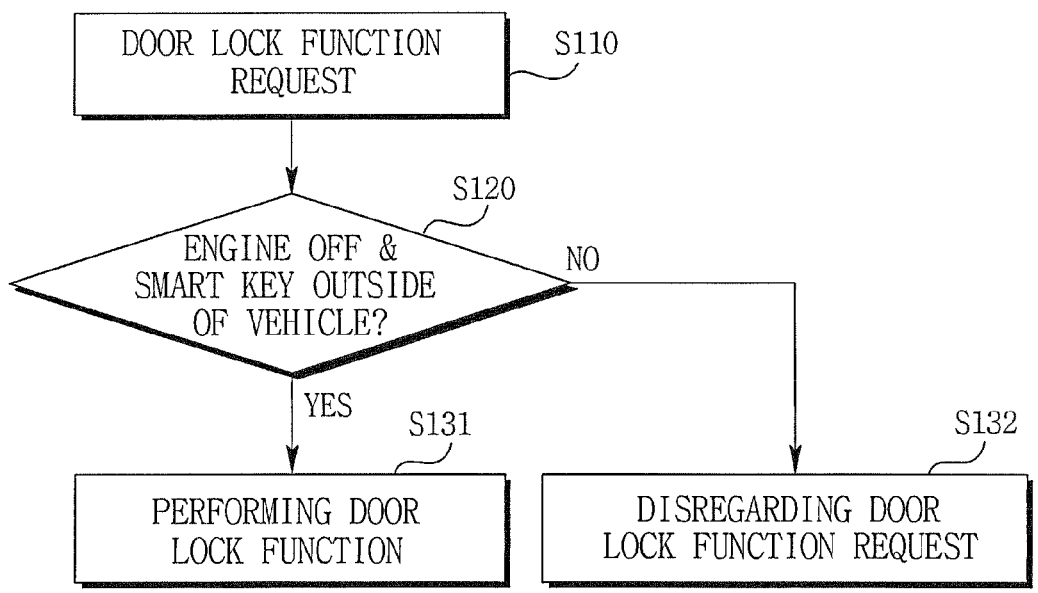
FIG. 1 is a schematic block diagram illustrating a door lock operation in a smart key system according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the method particularly pointed out in the written description and claims hereof as well as the appended drawings.

DETAILED DESCRIPTION

Hereinafter, exemplary embodiments of the present disclosure are described in detail with reference to the accompanying drawings. It will be appreciated that for simplicity and/or clarity of illustration, elements illustrated in the figure have not necessarily been drawn to scale. For example, the dimensions of some of the elements may be exaggerated relative to other elements for clarity. Further, if considered appropriate, reference numerals have been repeated among the figures to indicate corresponding and/or analogous elements.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In the following description and/or claims, the terms "comprise" and "include," along with their derivatives, may be used and are intended as synonyms for each other. Furthermore, the terms "including", "includes", "having", "has", "with", or variants thereof are used in the detailed description and/or the claims to denote non-exhaustive inclusion in a manner similar to the term "comprising".

Words such as "thereafter," "then," "next," etc. are not intended to limit the order of the processes; these words are simply used to guide the reader through the description of the methods. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In describing the present disclosure, detailed descriptions of constructions or processes known in the art may be omitted to avoid obscuring appreciation of the invention by a person of ordinary skill in the art with unnecessary detail regarding such known constructions and functions.

Now, the method for controlling a smart key system for door lock of a vehicle according to exemplary embodiments of the present disclosure will be described in detail with reference to the accompanying drawings.

FIG. 1 is a schematic block diagram illustrating a door lock operation in a smart key system according to an exemplary embodiment of the present disclosure.

Figure 2:
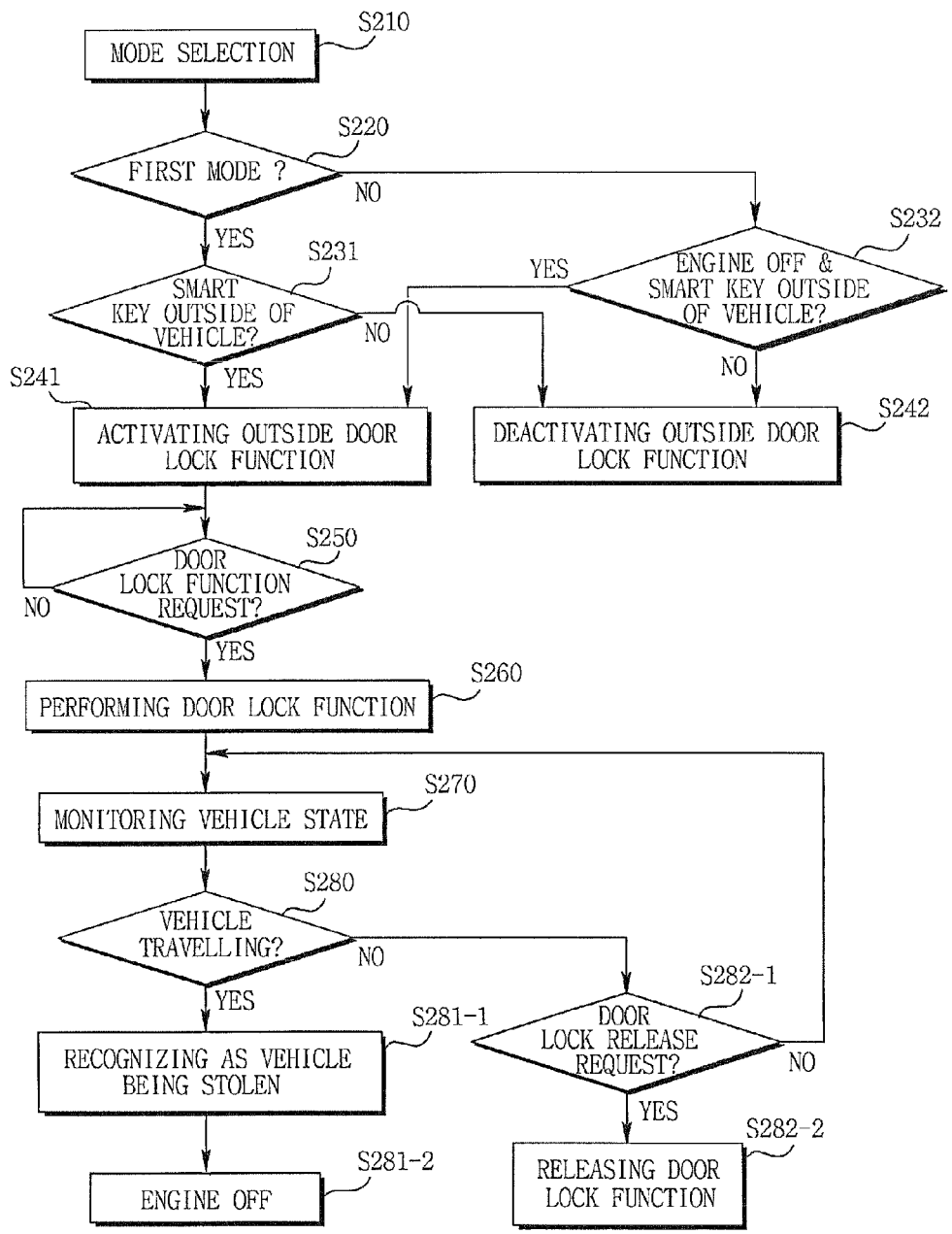
FIG. 2 is a schematic block diagram illustrating a door lock operation in a smart key system and theft prevention operation according to an exemplary embodiment of the present disclosure.

Meanwhile, operations disclosed in FIG. 1 may be applied to an exemplary embodiment of the present disclosure to be described in FIG. 2.

First, a request for the door lock function may be inputted from a user (S110). In a general circumstance, the door lock function of a vehicle defines an operation in which a vehicle key is inserted and turned, but in a vehicle equipped with a smart key system, the door lock function may be realized by an activation button, e.g., by a button mounted on door knob of the vehicle.

In a case the request for the door lock function is inputted, it can be checked whether an engine is in an ON or OFF state (S120). Furthermore, it can be also checked whether the smart key is present inside or outside of the vehicle (S120). The smart key system can detect whether the smart key is inside or outside of the vehicle through a distance recognition based on a received signal or a non-reception of a signal.

In the case the engine of the vehicle is turned off or in an OFF state, and the smart key is recognized as being outside of the vehicle, the request for the door lock function is accepted by the driver to perform the door lock function (S131).

In other cases, if a door lock function is requested by the driver outside of the vehicle, that is, if the thus mentioned button is depressed, the request for the door lock function is dismissed and the door lock function is not operated (S132). That is, the ON/OFF state of engine and activation/deactivation of outside door lock function based on position of the smart key will be explained as below, where the "outside door lock function" is defined as performance of door lock or door unlock of a vehicle door outside of the vehicle.

TABLE 1

|  | Case 1 | Case 2 | Case 3 | Case 4 |
| --- | --- | --- | --- | --- |
| Engine | ON | OFF | ON | OFF |
| Location of smart key | outside of vehicle | outside of vehicle | inside | inside |
| Outside door lock function | deactivated | activated | deactivated | deactivated |

That is, the door lock function of the vehicle can be performed outside of the vehicle, only when the engine is turned off or in an OFF state and the smart key is outside of the vehicle (Case 2 of TABLE 1).

Therefore, in the smart key system described in FIG. 1, in a case a driver holding the smart key stays out of the vehicle for a short period of time for stopping into a concession on a highway or for using an ATM (Automated Teller Machine) while the engine of the vehicle is still running or in an ON state (Case 1 in TABLE 1), there is a disadvantage that the door lock function cannot be performed. Furthermore, failure to perform the door lock function may expose the driver to a risk of the vehicle being stolen.

Meanwhile, as a measure to cope with the abovementioned awkward situation, a driver using the smart key system releases only the door lock function at a driver seat side, and inserts a passive key (or emergency key) of the smart key from outside of the vehicle into a passive key insertion slot mounted on the vehicle door to perform the door lock function. This function involves inconvenience of separating the passive key from the smart key, and there is still a risk of the vehicle being stolen through release of the door lock function from outside of the vehicle using various stealthy methods.

FIG. 2 is a schematic block diagram illustrating a door lock function in a smart key system and theft prevention function according to an exemplary embodiment of the present disclosure, in which at least two selectable modes may be provided. The door lock or theft prevention function may be performed based on selection of the at least two modes.

In a non-limiting example, a driver may be given a selective opportunity of using the door lock and theft prevention function under the first mode according to the exemplary embodiment of the present disclosure, or using a door lock function of second mode (S210).

The selection of modes may be enabled by various methods through a display unit available inside the vehicle. In a non-limiting example, a head lamp escort function applied to the currently manufactured vehicles or a mode selection method for automatic door lock function set-up during travel of a vehicle may be utilized.

A driver can check whether the first mode has been selected (S220). When the first mode is selected, it can be detected whether the engine is turned on, and whether a smart key is outside of vehicle (S231). More preferably, whether the smart key is outside of vehicle (Cases 1 and 2 in TABLE 1) can be detected regardless of engine ON/OFF state.

If it is determined that the first mode is selected, the engine of vehicle is turned on and the smart key is outside of vehicle, an outside door lock function operable from outside of vehicle can be activated (S241). Preferably, if it is determined that the first mode is selected and the smart key is outside of vehicle, an outside door lock function operable from outside of vehicle can be activated.

Even if the first mode is selected and if it is determined that the smart key is inside the vehicle, the outside door lock function can be deactivated (S242). That is, the outside door lock function can be activated depending on location of smart key, for example, inside or outside of vehicle.

Furthermore, if the driver selects the second mode, the outside door lock function of the smart key system may be performed in the method similar to that of FIG. 1. That is, in a case the second mode is selected, a determination is made as to whether the engine of vehicle is turned off and the smart key is outside of vehicle (S232), and the outside door lock function is activated (S241) only if the engine is turned off and the smart key is outside of vehicle, and the outside door lock function may be deactivated in other cases (S242).

If the outside door lock function is activated (S241), the request for the door lock function by the driver or user is awaited and detection is made as to whether the request has been inputted (S250). If the request is inputted, the door lock function is performed (S260), and otherwise the request for the door lock function may be awaited again.

After the door lock function is performed, the theft prevention function is performed since the engine is turned on and there is no one inside the vehicle. Of course, the theft prevention function is not activated by trembling of vehicle or the door lock release using an unauthorized key.

The ECU (Electronic Control Unit) of a vehicle may monitor state of the vehicle (S270). Particularly, the ECU can determine whether the vehicle is traveling (S280), and if the vehicle is traveling, the ECU may recognize that the vehicle has been stolen (S281-1), and may turn off the engine of the vehicle (S281-2).

At this time, if an engine of a vehicle is suddenly turned off during traveling on a high way at a high speed, other incidental accidents may occur and inflict a physical damage on passengers inside the vehicle and other people outside the vehicle. Thus, the engine is preferably turned off when the vehicle is running at a low speed. In a non-limiting example, if the traveling speed of a vehicle exceeds 20 km/h, it may be preferable that the engine of the vehicle be stopped.

If the vehicle is not traveling, monitoring is made as to whether a request for door lock release has been inputted (S282-1), and if the request has been inputted, the door lock function may be released (S282-2). Furthermore, although not illustrated, the request for door lock release may be awaited for a predetermined period of time, and the engine may be turned off if the request for door lock release is not inputted. If the driver is outside of vehicle for business while the engine is still running, and if the business takes longer time than is expected, the engine may be turned off to save fuel and remove any uneasy and risk factor.

Figure 3:
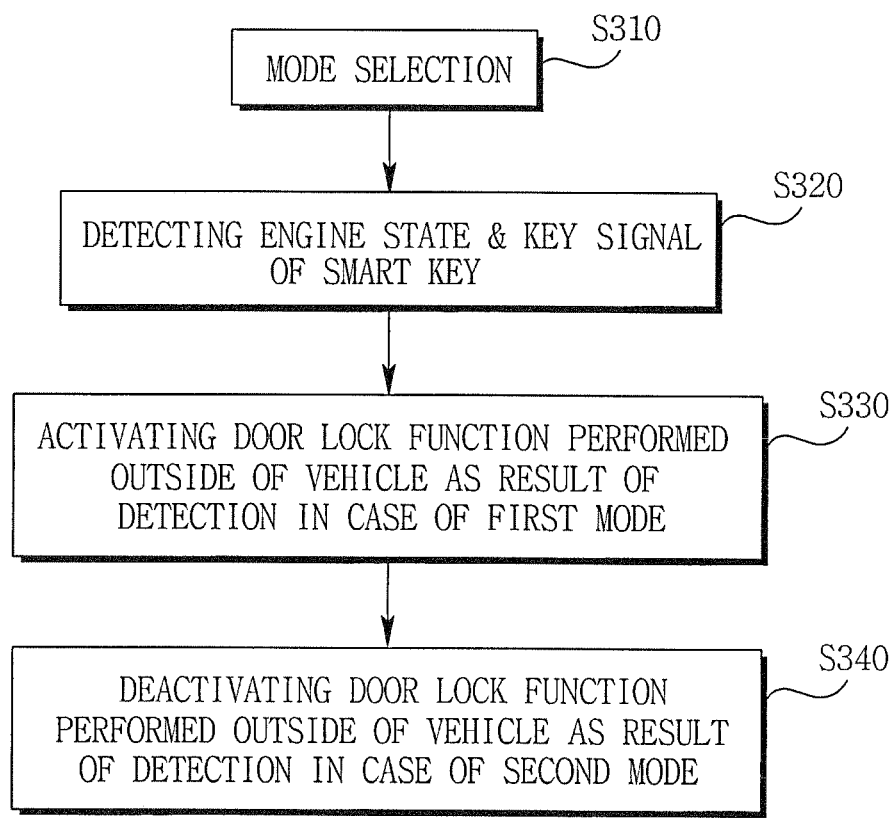
FIG. 3 is a schematic block diagram illustrating a door lock operation in a smart key system and theft prevention operation according to another exemplary embodiment of the present disclosure.

FIG. 3 is a schematic block diagram illustrating a door lock function in a smart key system and theft prevention function according to another exemplary embodiment of the present disclosure.

The method of FIG. 3 relates to a method for controlling a smart key system configured with two modes, and may include selecting any one of a first mode and a second mode (S310), detecting an engine state (ON/OFF) of a vehicle and a key signal of smart key (S320), activating a door lock function performed outside of the vehicle as a result of the detection if the first mode is selected (S330), and activating the door lock function performed outside of the vehicle as a result of the detection if the second mode is selected (S340).

The step (S310) is provided to select two modes. A method for controlling a smart key system for door lock function under the first mode according to the exemplary embodiment of the present disclosure may be selected, or a method for controlling a smart key system for door lock under the second mode according to the exemplary embodiment of the present disclosure may be selected, depending on user (driver) convenience.

The step of S320 of detecting the key signal of smart key may detect whether the smart key is inside or outside of the vehicle. Furthermore, the step of S320 can detect whether engine of vehicle is turned on or turned off. That is, the step of S320 can detect whether the engine is in the running state or in the stopping state.

In a case the first mode is selected at step S310, the door lock function performed outside of the vehicle may be activated as a result of the detection at step S320 (S330). In a non-limiting example, if it is determined that the smart key is outside of the vehicle, the door lock function performed outside of the vehicle may be activated (S330).

Generally, the door lock function cannot be performed with a smart key held by the driver outside of the vehicle while engine is still running in the conventional smart key system, thereby resulting in occurrence of inconvenience to the driver.

If the door lock function is activated, the request for door lock function by the driver may be awaited. The driver being already moved outside of the vehicle, it can be expected that the request for door lock function is inputted within a predetermined period of time. Even if the driver forgets requesting the door lock function, a warning sound may be generated until the request for door lock function is inputted. Once the request for door lock function is inputted, the door lock function can be performed.

In a case the second mode is selected at step S310, the door lock function to be performed outside of the vehicle may be deactivated as a result of detection at step S320 (S330). In a non-limiting example, if the smart key is present outside of the vehicle and the engine of the vehicle is turned off, the door lock function may be deactivated.

In a case the second mode is selected, and even if the smart key is present outside of the vehicle, the outside door lock function cannot be operated as long as the engine is turned on. Thereafter, a state of vehicle for theft prevention may be monitored (S340).

Meanwhile, even if the request for door lock function is not inputted, the step of S340 for monitoring the state of vehicle for theft prevention may be progressed. Alternatively, in a case the door lock request is not inputted, the door of the vehicle may be made to be automatically locked or closed after elapse of a predetermined period of time.

The monitoring step S340 can detect the movement of vehicle, and determine that the vehicle has been stolen if the traveling speed of the vehicle exceeds a predetermined value, and immediately turn off the engine of the vehicle (S350). Furthermore, the vehicle state monitoring step S340 may additionally monitor the engine ON/OFF state and the traveling speed of vehicle.

The method may further include a step of transmitting a message to the police or a vehicle owner if it is recognized that the vehicle has been stolen. The additional method is to inform the vehicle owner and the law enforcement office of the vehicle theft fact and to retrieve the vehicle as fast as possible or within a bit quicker period of time.

The step S330 of activating the door lock function performed outside of vehicle may allow the driver holding the smart key to perform the door lock function outside of the vehicle, in case the engine is turned on. The step of activating the door lock function performed outside of the vehicle may further include performing a lock function of the steering wheel, if the function is performed outside of the vehicle, to initially prevent the vehicle from operating, even if the vehicle theft is attempted.

Although the method for controlling the smart key system for door lock according to FIG. 3 has described the mode selection step (S310), it is not mandatory that one of the first and second modes must be selected. In a non-limiting example, the door lock function performed outside of vehicle may be activated by a result of detection of engine state and smart key signal.

As apparent from the foregoing, the method for controlling a smart key system for door lock according to the exemplary embodiment of the present disclosure has an industrial applicability in that a driver possessing a smart key can lock or unlock a door lock device (door lock) of a vehicle equipped with a smart key system under a state the smart key is located outside of the vehicle, thereby providing the driver a convenience, a function that is performed only by a passive key of the smart key, and a function capable of preventing a vehicle theft that may be resulted from the door lock function performed outside of the vehicle, the operations of which can be activated or deactivated by a user selection.

While particular features or aspects may have been disclosed with respect to several embodiments, such features or aspects may be selectively combined with one or more other features and/or aspects of other embodiments as may be desired.

The previous description of the present disclosure is provided to enable any person skilled in the art to make or use the invention. Various modifications to the disclosure will be readily apparent to those skilled in the art, and the generic principles defined herein may be applied to other variations without departing from the spirit or scope of the disclosure. Thus, the instant disclosure is not intended to limit the examples described herein, but is to be accorded the widest scope consistent with the principles and novel features disclosed herein.

What is claimed is:

1. A method for controlling a smart key system for door lock of a vehicle, the method comprising:
receiving a user's selection for a first mode or a second mode, the first mode including a mode where both door-lock and theft prevention are performed when a request for the door-lock from an activation button mounted outside the vehicle is received, and the second mode including a mode where the door-lock is performed when the request for the door-lock from the activation button mounted outside the vehicle is received if an engine of the vehicle is off and the smart key is outside the vehicle and where the request for the door-lock from the activation button mounted outside the vehicle is disregarded if the engine is on or the smart key is inside the vehicle;
receiving the request for the door-lock from the activation button mounted outside the vehicle;
determining whether the smart key is inside the vehicle;
locking the door of the vehicle when it is determined that the user has selected the first mode and the smart key is outside the vehicle;
determining whether the vehicle is traveling when the user has selected the first mode and the door has been locked based on the request from the activation button mounted outside the vehicle; and
turning off the engine of the vehicle when the user has selected the first mode, the door has been locked based on the request from the activation button mounted outside the vehicle, and it is determined that the vehicle is traveling determining whether the engine of the vehicle is in an ON state or an OFF state when the request for the door-lock is received;
wherein the locking the door of the vehicle when it is determined that the user has selected the first mode, and the smart key is outside the vehicle comprises locking the door of the vehicle when it is determined that the user has selected the first mode, the smart key is outside the vehicle, and the engine of the vehicle is in an ON state.

2. The method of claim 1, further comprising:
disregarding the request for the door-lock from the activation button mounted outside when it is determined that the smart key is inside the vehicle.

3. The method of claim 1, wherein turning off the engine of the vehicle when the user has selected the first mode, the door has been locked based on the request from the activation button mounted outside the vehicle, and it is determined that the vehicle is traveling comprises turning off the engine of the vehicle when the vehicle exceeds a predetermined speed.

4. The method of claim 1, further comprising:
unlocking the door when a request for door-unlock from the activation button mounted outside the vehicle is received.

5. The method of claim 4, further comprising:
turning off the engine of the vehicle when the vehicle is not traveling, the engine is on, and a request for the door-unlock has not been received after a predetermined period of time after the request for door-lock was received.

* * * * *